United States Patent [19]
Brown et al.

[11] Patent Number: 5,549,000
[45] Date of Patent: Aug. 27, 1996

[54] PASSIVE ACOUSTIC DETECTION OF PIPELINE PIGS

[75] Inventors: Winthrop K. Brown, Bellaire; Victor Diatschenko, Houston; James R. Stoy, Missouri City, all of Tex.

[73] Assignee: Texaco, Inc., White Plains, N.Y.

[21] Appl. No.: 488,697

[22] Filed: Jun. 9, 1995

Related U.S. Application Data

[63] Continuation-in-part of Ser. No. 265,878, Jun. 27, 1994, abandoned.

[51] Int. Cl.⁶ .................................................... G01H 1/00
[52] U.S. Cl. ............................................. 73/587; 73/592
[58] Field of Search .......................... 73/587, 592, 405 A, 73/623, 622, 12.01; 15/104.063

[56] References Cited

U.S. PATENT DOCUMENTS 4,590,799  5/1986  Brown et al. ............................. 73/587
5,385,049  1/1995  Hunt et al. ............................... 73/592
5,417,112  5/1995  Rosenberg ................................ 73/587

*Primary Examiner*—Hezron E. Williams
*Assistant Examiner*—Nashmiya Ashraf
*Attorney, Agent, or Firm*—Kenneth R. Priem; Cynthia L. Hunter; James L. Bailey

[57] ABSTRACT

The present invention determines the presence of a pig in a pipeline and the condition of the pig, as regards to the material the pig may be pushing, by passive acoustic detectors which determine the acoustic characteristics for the pipe and the pig. From these a computer is used to determine from changes in these characteristics the nature of the materials picked up by the pig or the condition of the pig and the pipe.

6 Claims, 1 Drawing Sheet

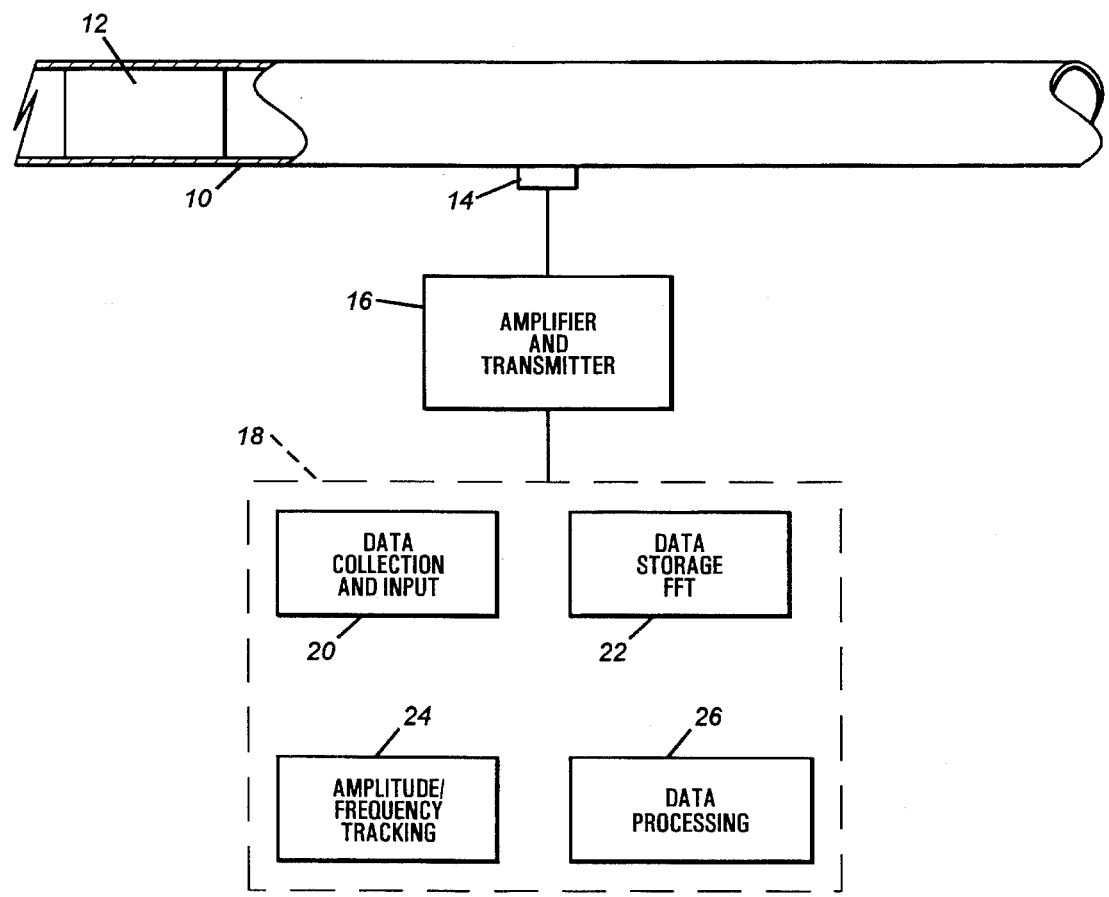

PASSIVE ACOUSTIC DETECTION OF PIPELINE PIGS

This Application is a continuation-in-part of Application Ser. No. 08/265,878 filed Jun. 27, 1994 now abandoned.

BACKGROUND OF THE INVENTION

1. The Field of the Invention

The present invention pertains to a method and apparatus to determine the presence of a movable vehicle or pig in a pipeline and, in particular, to identify changes in the acoustic signature of a pig.

2. The Prior Art

Devices which are propelled through pipelines by the fluid flow in the line are called "pigs" and are most often used to clean and/or inspect the pipe or to separate different batches of fluid flowing through the pipe. It is often useful to know when a pig has passed a particular point in the pipe and, if possible, the condition of the pig. There are several methods and devices presently used which are capable of determining the passage of a pig. For example, a mechanical device is attached to the pipe with an actuator portion thereof extending into the pipe. The passing pig trips this actuator through physical contact. The device then actuates mechanical indicator, such as a flag, or an electrical indicator, such as a switch, to indicate that the pig has passed that point. Other devices comprise magnetic, acoustic or electromagnetic sources attached to the pig and a separate detector (or receiver) responsive to the source and located inside or outside the pipe. The detector responds to the signal, or magnetic field, from the passing pig and actuates an indicator.

The ideal pig detector would not only determine the passage of the pig, but the condition of the pig. For example, is the pig in need of repair or has the pig scraped up enough debris from inside the pipe that it should be removed and cleaned and/or repaired. This detector should be capable of use in extreme temperatures, pressures and hostile chemical environments while providing accurate results. The construction of this detector would be such that it would be simple and suitable for field applications as well as usage in the laboratory.

An additional example of the prior art involves the use of ultrasonic techniques for fluid characterization applications. These types of systems can be intrusive or non-intrusive, depending on the application. For example, composition of two-phase fluids can be investigated using an intrusive transit time method, as described in U.S. Pat. No. 5,115,670. This method contemplates the measurement of the transit time of a sound wave between an ultrasonic source and a detector located diagonally across a pipe. In principle this transit time can be used to calculate the speed of sound in two-phase flow. This allows the calculation of the mixture's linear velocity and composition. These quantities allow the calculation of mass flow rates or the energy flow rates. The calculated results and their accuracy, for example steam quality, may depend on separate fluid property correlations. The fluid's chemical composition may effect the sensor's longevity.

Fluid velocities can be obtained using Doppler flow meters (see U.S. Pat. No. 5,115,670). These ultrasonic devices can be non-intrusive (externally mounted in the pipe) and protected from the environment. The idea behind these devices is that an ultrasonic signal is continuously transmitted into a pipe containing fluids where scattering occurs from suspended solids, air bubbles, discontinuities or disturbances in the flowing stream. The scattered signal is detected and its frequency is compared to the transmitted frequency. The difference in these frequencies is proportional to the fluid's velocity. These measurements are considered most accurate when evaluating fluids with Newtonian flow profiles and containing suspended particles or air bubbles.

Generally, the designs of existing flow measurement systems using nuclear, acoustic or electromagnetic methods only address a few of the idealized capabilities and concentrate on measuring a restricted set of parameters while actively probing the medium of interest. These measurement systems can be intrusive or non-intrusive and some may require a side stream sample to obtain the required data. Examples of some of the active acoustic flow measurement systems can be found in U.S. Pat. Nos. 4,080,837; 4,236,406; and 4,391,149.

Passive types of measurement techniques in pipes, specifically simple detection of acoustic emissions or "listening," are available, but are limited in scope and applications. For instance, acoustic emissions can be used to detect: slug flow and the presence of sand in multi-phase pipelines (see U.S. Pat. No. 5,148,405); leaks in natural gas pipelines (see U.S. Pat. No. 5,117,676); and steam quality when the acoustic emissions are obtained from a calibrated steam jet produced by an orifice (see U.S. Pat. No. 4,193,290). The use of acoustic emissions as a passive and non-intrusive method in quantitative characterization of multi-phase flow in pipes appears to be novel.

SUMMARY OF THE INVENTION

The presence of a pig in a pipe and its condition, with respect to it has accumulated debris and require cleaning or does the pig require repair, is determined by a comparison of the vibrational characteristics of an unknown pig and standard vibrational characteristics of the same type of pig in known environments.

BRIEF DESCRIPTION OF THE DRAWINGS

The present invention will now be described, by way of example, with reference to the accompanying drawings in which the single figure diagrammatically illustrates an embodiment of the present invention.

DETAILED DESCRIPTION OF THE PRESENT INVENTION

It is commonly known that a pig moving through a pipe will generate vibrational or acoustic noise within the pipe. This noise interpreted properly can be indicative of the type and condition of the pig. In principle, this naturally occurring phenomenon should be able to provide information about the pig as it moves in the pipe.

FIG. 1 diagrammatically illustrates apparatus that has been used to identify the characteristics of a pig 12 moving through a pipe 10. An accelerometer 14, or other vibration sensitive sensor, is attached to the pipe 12 at a point where the measurement is to be made. The sensor 14 is a quartz shear mode accelerometer which, for best acoustic coupling, may be glued or cemented to the pipeline 10. The moving pig 12 set the pipe 10 into vibration in several vibratory modes. In particular it has been found to be advantageous to detect via a directional sensor, such as the quartz shear mode sensor with its sensitive shear mode axis aligned radially along a radius of the pipe 10, radial vibrations of the pipe 10 which are indicative of a hoop mode of vibration of the pipe 10. In some cases small metal pads can be glued or otherwise attached to the pipe and the accelerometer 14 attached to this pipe via a threaded stud. The accelerometer 14 may also contain in its housing a built in charge preamplifier to increase the level of electrical output signals from the device. An example of this type of sensor 14 is the type SA 390 manufactured by the Scientific Atlanta Co. of Atlanta, Ga. The electrical signals from this sensor 14, if necessary, are fed into a pre-amplifier 16 for amplification and transmission to signal processing instrumentation 18. This instrumentation 18 preferably would include: analyzer means 22 having an analog to digital converter and capable of performing a Fast Fourier Transform (FFT) on the converted incoming time domain digital signals; frequency and amplitude tracking means 24 including a display means for visual monitoring of the spectra; and data entry means 20 and processing means 26 which may be for example a PC or portions thereof such as a microprocessor of the Intel 80386, 80486 family or the like.

As a pig 12 is propelled through the pipe 10, the pig generates pipe vibrations interpreted as a characteristic acoustical signature. Each type of pig has it's own distinctive acoustic signature of pipe vibration. This sound is detected with an accelerometer 14, attached to the outside of the pipe 10. As the pig 12 passes the transducer the amplitude of the vibrations will increase and a doppler shift in frequency can occur. The magnitude of the doppler shift can be used to measure the pig's velocity. If the characteristic acoustic signature for the type of pig is known in advance, other information may be determined. The type and amount of material (such as paraffin) built up in front of the pig will modify the signature in a measurable way. The condition of the pig, including worn cups, fluid leakage, or scraper condition (in scraper pigs) will each have it's own effect on the sound pattern or spectrum.

Working with the digitized frequency spectral component signals produced by the data storage and Fast Fourier Transform means 22 the computer 26 is used to perform analysis of vibrations (hoop mode) sensed by sensor 14. For example, a particular type of pig has been observed experimentally to produce a frequency spectrum of detected signals having a sharp amplitude peak in a relatively narrow band of frequencies. This narrow frequency band of higher amplitude signals lies in a frequency range about a center frequency which may be termed the characteristic frequency (of pipe vibrations) produced by that particular pig or type of pig. Now as the pig approaches the detector in the pipe, this amplitude peak (or characteristic frequency) of detected signals exhibits a doppler effect shift towards a higher frequency due to the motion. As the pig passes directly under the detector the doppler shift in frequency of the peak energy frequency components goes to zero, thus the amplitude peaking at the known (a prior: from experiment) characteristic frequency of the pig at the instant of passage. As the pig then goes away from the stationary detector there will be a doppler effect shift in the frequency location (to a lower frequency) of the amplitude peak in the frequency spectrum. Thus by monitoring the amplitude of the signals in a narrow frequency band including and on both sides of the characteristic frequency of the pig the speed of the pig and its arrival time at the detector can be obtained. It should be noted that certain resonance frequencies of the pipe in various hoop modes of vibration will also be generated by the driving motion of the pig in the pipe. The peaks in the spectrum of frequencies detected due to this effect are dependent primarily on the dimensions of the pipe and may be termed hoop mode resonances. These frequencies will not exhibit a doppler shift as the pig passes.

Another example of useful information which may be monitored by computer 26 in the spectral data of signals generated by the sensor 14 is as follows. It has been shown that in a gas pipeline containing a moving pig, that if the pig is pushing a slug of liquid in front of it as it moves through the pipe, that there is a significant reduction in the amplitude of the hoop mode resonance of the pipe in the higher frequency modes. Thus by monitoring the amplitude of the higher frequency components of hoop mode resonances, and by normalizing this measurement to pig motion, by forming a ratio of the amplitudes of higher frequency resonances to lower frequency resonances of the pipe, a diminution in the amplitude of the higher frequency components with respect to lower frequency components may be measured. Such a diminution is then indicative of a liquid slug pushed in front of the pig.

As previously noted, the hoop mode resonances of a particular pipe depend directly on the internal pipe dimension. Thus if a pig changes the effective internal diameter of a pipe by, for example, scraping off a layer of wax from the inside surface, the characteristic frequency of a particular hoop mode resonance (and all others) will be changed due to this effective internal diameter change of the pipe. Thus computer 26 by monitoring slight changes of frequency of the resonances can detect effective cleaning of the pipe by the pig.

An acoustic pig detection system such as discussed herein can be anywhere from a stand alone temporary device to a complex monitoring system permanently installed on many pipes simultaneously. The acoustic transducer 14 can use a conventional piezoelectric accelerometer or bender attached to the pipe. Fiber optic acoustic transducers of several types could also be used if desired. The fiber optic transducers are intrinsically safe, more sensitive, and less susceptible to noise. Many fiber optic acoustic sensors can be multiplexed on an single fiber. Other types of acoustic sensors could also be used depending on the application. These include magnetic, capacitive, etc. The instrumentation portion 18 can use digital signal processing or more conventional filters and level detectors depending on the amount of information desired.

A passive acoustic pig detection system has several advantages over more conventional pig detection. Unlike the mechanical detection systems there are no moving parts and nothing intrudes into the pipe. The pig itself does not need to be modified or have some kind of transmitter attached. Since the only device needed at the pipe section of interest is the transducer, this method is suitable for harsh environments including sub sea and explosive environments. This is especially true for the fiber optic transducers. Transducers can be attached while the pipe is in operation.

If there is an accumulation of material in front of the pig, there is a distinct change in the signature as the leading edge of the accumulated material passes the transducer. For example, in tests at Brookeland field a pig with an accumulation of liquid in front of it passed through a gas pipeline. As the front of the liquid passed the overall sound level dropped and then increased suddenly as the pig passed.

This acoustic pig detection method can be implemented along with other passive acoustic pipe monitoring systems that use substantially the same hardware. Only additional software and signal processing is required. These include acoustic leak detection and passive acoustic flow and flow regime detection.

The present invention may be subject to many modification and changes without departing from the spirit or essential characteristics thereof. The present embodiment should therefore be considered in all respects as illustrative and not restrictive of the scope of the present invention as defined by the appended claims.

We claim:

1. A non-invasive passive acoustic system for determining the condition and passage of a pig moving in a pipe comprising:

vibration sensing means in intimate physical contact with the exterior surface of a pipe, for generating electrical signals representative of radial or hoop modes vibration of said pipe;

Fast Fourier Transform means for separating said electrical signals into frequency components therefore to determine the characteristic radial or hoop mode vibrational frequency of a system of said pig and pipe with said pig moving in said pipe;

means for tracking any changes in amplitude and/or frequency of said characteristic radial or hoop mode vibrational frequency of said system; and data processing means for determining the condition and passage of said pig from said any changes in amplitude and/or frequency of said characteristic radial or hoop mode vibrational frequency.

2. A system according to claim 1 wherein said vibration sensing means is a shear mode piezoelectric accelerometer.

3. A method for detecting the presence of a pig in a pipeline and the type and amount of material being carried by the pig, comprising the steps of:

providing acoustic vibration sensing means in physical contact with the exterior surface of the pipeline, said vibration sensing means being capable of generating first electrical signals representative of the radial vibrations of said pipeline exterior surface as a first pig moves therein and separating said first electrical signals into characteristic frequency spectral components to generate a characteristic first pig acoustic signature;

propelling a second pig through said pipeline and sensing radial vibrations of said pipeline exterior surface by said sensing means to generate second electrical signals representative thereof and separating said second electrical signals into characteristic frequency spectral components to generate a characteristic second pig acoustic signature; and comparing said first and second pig characteristic acoustic signatures in frequency and amplitude to determine the type and amount of any material built up in front of said second pig with respect to said first pig.

4. The method of claim 1 wherein the step of separating said first and second representative electrical signals into characteristic frequency spectral components is performed by Fast Fourier Transform.

5. The method of claim 1 wherein the step of providing acoustic vibration sensing means in physical contact with the exterior surface of the pipeline is performed by providing a piezoelectric shear mode accelerometer transducer.

6. The method of claim 1 wherein the step of providing acoustic vibration sensing means in physical contact with the exterior surface of the pipeline is performed by providing a fiber optic transducer.

* * * * *